(12) United States Patent
Keller et al.

(10) Patent No.: US 11,918,109 B2
(45) Date of Patent: Mar. 5, 2024

(54) CROSSMEMBER, CROSSMEMBER SET, AND FURNITURE KIT

(71) Applicant: VITRA AG, Birsfelden (CH)

(72) Inventors: Stefan Keller, Steinen-Hofen (DE); Helmut Schütt, Mülllheim-Hügelheim (DE)

(73) Assignee: VITRA AG, Birsfelden (CH)

( * ) Notice: Subject to any disclaimer, the term of this patent is extended or adjusted under 35 U.S.C. 154(b) by 0 days.

(21) Appl. No.: 17/779,462

(22) PCT Filed: Nov. 25, 2020

(86) PCT No.: PCT/EP2020/083388
§ 371 (c)(1),
(2) Date: May 24, 2022

(87) PCT Pub. No.: WO2021/105226
PCT Pub. Date: Jun. 3, 2021

(65) Prior Publication Data
US 2022/0408916 A1    Dec. 29, 2022

(30) Foreign Application Priority Data
Nov. 25, 2019    (CH) .................................. 01486/19

(51) Int. Cl.
*A47B 47/02* (2006.01)
*A47B 47/00* (2006.01)
(Continued)

(52) U.S. Cl.
CPC ........ *A47B 47/028* (2013.01); *A47B 47/0058* (2013.01); *A47B 87/001* (2013.01); *F16B 12/40* (2013.01)

(58) Field of Classification Search
CPC . A47B 47/028; A47B 47/0058; A47B 87/001; A47B 47/00; A47B 47/0083;
(Continued)

(56) References Cited

U.S. PATENT DOCUMENTS

| 1,949,594 A | * | 3/1934 | Wightman | ........... A63H 33/006 482/86 |
| 2,619,390 A | * | 11/1952 | Johnson | .................. E04G 1/154 182/119 |

(Continued)

FOREIGN PATENT DOCUMENTS

| EP | 0262090 A1 | 3/1988 |
| FR | 2984430 A1 | 6/2013 |

OTHER PUBLICATIONS

International Search Report and Written Opinion dated Jan. 26, 2021 in Intl Appln No. PCT/EP2020/083388.

*Primary Examiner* — Devin K Barnett
(74) *Attorney, Agent, or Firm* — MEDLER FERRO WOODHOUSE & MILLS PLLC (57) ABSTRACT

A crossmember is disclosed that includes an elongate rod portion and two latching claws. The rod portion has a central longitudinal axis, a first longitudinal end and a second longitudinal end substantially opposite the first longitudinal end. The first latching claw is arranged at the first longitudinal end of the rod portion and the second latching claw is arranged at the second longitudinal end of the rod portion. The first latching claw and the second latching claw each include a gripping portion shaped to correspond to a rod-shaped element and are designed to be mounted on the rod-shaped element without tools. The gripping portion of the first latching claw is offset from the gripping portion of the second latching claw with respect to the central longitudinal axis of the rod portion.

8 Claims, 5 Drawing Sheets

(51) Int. Cl.
*A47B 87/00* (2006.01)
*F16B 12/40* (2006.01)

(58) Field of Classification Search
CPC ... A47B 47/0091; A47B 47/02; A47B 47/021; A47B 47/027; A47B 57/06; F16B 12/40; E06C 7/16
See application file for complete search history.

(56) References Cited

U.S. PATENT DOCUMENTS

| | | | | |
|---|---|---|---|---|
| 2,665,950 | A * | 1/1954 | Johnson | F16B 7/22 182/115 |
| 2,845,307 | A * | 7/1958 | Holmes | E04G 7/308 410/144 |
| 2,941,616 | A * | 6/1960 | Grover | E04G 1/34 182/180.1 |
| 3,011,586 | A * | 12/1961 | Harvey, Jr. | E04H 12/185 182/180.1 |
| 3,454,131 | A * | 7/1969 | Johnson | E04G 5/10 182/180.1 |
| 3,690,407 | A * | 9/1972 | Cullison | E04G 1/152 182/178.4 |
| 3,837,427 | A * | 9/1974 | Mattinson | E04G 1/14 182/115 |
| 3,897,055 | A * | 7/1975 | Caldow | A63B 9/00 482/36 |
| 4,561,165 | A * | 12/1985 | Bayer | E04G 1/152 403/374.2 |
| 4,586,842 | A * | 5/1986 | Puccinelli | E04G 7/307 182/186.8 |
| 4,648,484 | A * | 3/1987 | Lovering | E04G 1/154 182/119 |
| 4,715,474 | A * | 12/1987 | Wehmeyer | E04G 7/306 403/268 |
| 4,967,671 | A | 11/1990 | Scherrer | |
| 5,078,532 | A * | 1/1992 | Williams | E04G 7/308 403/174 |
| 5,427,465 | A * | 6/1995 | Sato | E04G 7/16 403/385 |
| 6,305,868 | B1 * | 10/2001 | Kinoshita | E04G 7/305 52/655.1 |
| 6,733,444 | B2 * | 5/2004 | Phillips | A61B 17/0206 600/213 |
| 7,954,598 | B2 * | 6/2011 | Wallther | E04G 5/147 182/113 |
| 8,931,594 | B2 * | 1/2015 | Kreller | E04G 7/307 182/186.7 |
| 11,639,607 | B2 * | 5/2023 | Behrbohm | E04G 7/28 182/222 |
| 2011/0088973 | A1 * | 4/2011 | Shih | E04G 5/10 182/115 |

\* cited by examiner

CROSSMEMBER, CROSSMEMBER SET, AND FURNITURE KIT

TECHNICAL FIELD

The invention relates to a crossmember as disclosed herein, as well as to a crossmember set and a furniture kit comprising such a crossmember.

Such crossmembers having an elongate rod portion, where the rod portion has a central longitudinal axis, a first longitudinal end and a second longitudinal end substantially opposite the first longitudinal end, can be used to assemble furniture such as frames and tables.

BACKGROUND

For the flexible assembly of furniture, systems are known in which furniture can be variably assembled from basic components. Variable modular furniture systems are especially common in commercial stores or in offices, where the furniture or the requirements for the furniture typically change from time to time.

Known variable modular furniture systems are often based on a three-dimensional supporting tube structure that can be constructed in different ways. For example, EP 0 262 090 A1 describes a furniture structure that has a plurality of tubes that can be connected via node elements. In this system, the tubes can be assembled in different ways by means of the node elements, and in particular frames can be created in different shapes. The connected tubes can also be equipped with screens and shelves that are mounted between the tubes.

In modern office landscapes, among other things, there is an increasing need to frequently and extensively adjust the furniture. Despite their variability, known modular furniture systems are disadvantageous because they have to be dismantled and reassembled in a complex manner. This conversion is typically carried out by trained persons using special tools. This is necessary for safety reasons, among other things, since the modular furniture system must ensure that the furniture created therewith is sufficiently stable. Unstable furniture can pose a significant risk to people, especially in the case of comparatively tall and/or heavily loaded furniture.

Since, as mentioned above, assembling, converting and dismantling furniture using the known modular furniture systems is complex and can pose a safety risk if not carried out properly, people nowadays often refrain from adapting the furniture as their needs change. For example, in open office landscapes where it might make sense to adapt the furniture on a project-by-project basis, the variability of modular furniture systems is not utilized.

The object of the following invention is therefore to propose a system or components for a system with which furniture can be created and converted flexibly in a simple manner, virtually without tools. In particular, the system or components are intended to enable frames and work tables to be assembled, converted and dismantled flexibly, efficiently and safely.

SUMMARY OF EMBODIMENTS OF THE INVENTION

The object is achieved according to the invention by a crossmember, a crossmember set, and a furniture kit as described herein. Advantageous embodiments of the invention result from the description found herein.

The essence of the invention is as follows: A crossmember comprises an elongate rod portion, a first latching claw and a second latching claw. The rod portion has a central longitudinal axis, a first longitudinal end, and a second longitudinal end substantially opposite the first longitudinal end. The first latching claw is located at the first longitudinal end of the rod portion and the second latching claw is located at the second longitudinal end of the rod portion. The first latching claw and the second latching claw each comprise a gripping portion shaped to correspond to a rod-shaped element. In addition, they are each designed to be mounted on the rod-shaped element without the use of tools. The gripping portion of the first latching claw is offset from the gripping portion of the second latching claw with respect to the central longitudinal axis of the rod portion.

In the context of the invention, the term "crossmember" refers to a largely elongate component which may be suitable for being arranged between two other components, thereby connecting and stabilizing these two other components. In particular, the crossmember can be a mechanical support that is used for stabilization, attachment and/or connection. The crossmember can also be referred to as a beam or crossbeam.

The rod portion of the crossmember can be designed as a solid or in particular hollow rod profile, for example in the form of a tube having any desired cross section. In particular, it can be a tube having a circular or polygonal cross section.

The expression "central longitudinal axis" in relation to the rod portion refers to a straight axis extending through the center of a cross section of the rod portion along the rod portion. In the case of a rod portion having a circular cross section, the central longitudinal axis extends through the center of the circle of the cross section. In the case of a rod portion that has an at least partially circular-segment-shaped cross section, the central longitudinal axis can extend through the center of the circular segment.

By offsetting the gripping portion of the first latching claw from the gripping portion of the second latching claw with respect to the central longitudinal axis of the rod portion, two identical crossmembers can be mounted on the same rod-shaped element in such a way that they are in a line or that their central longitudinal axes lie on a straight line. In this way, furniture such as frames can be assembled efficiently and in a space-saving manner. Other three-dimensional tubular constructions such as scaffolding can also be built efficiently in this way.

The term "furniture" in the context of the invention refers to furnishings primarily in interior spaces such as homes, stores, offices or other units of use. Typically, furniture is movable, as opposed to immovable objects (real estate) that are fixed to the ground or structural assets. In most cases, furniture has a predetermined purpose and is intended for a specific use. Typical furniture can be tables, chairs, shelves, storage units and the like.

Preferably, the first latching claw and the second latching claw are each equipped with a spring element and a slider, the slider being movable between a locked position and an open position and the spring element pressing the slider into the locked position.

In connection with the slider, the term "locked position" can refer to a position of the slider in which it surrounds the tubular element together with the associated gripping portion in such a way that the crossmember is fastened to the tubular element. In contrast, the term "open position" in relation to the slider can refer to it being moved toward the gripping portion such that the latching claw can be removed from the tubular element.

The spring pushing the slider into the locked position makes it possible for the latching claw to be closed when it is not actively opened by moving the slider with force. As a result, a secure connection of the crossmember to the rod-shaped element can be achieved. In particular, unintentional detachment of the latching claw from the rod-shaped element can be avoided.

The slider of the first latching claw is preferably offset from the slider of the second latching claw with respect to the central longitudinal axis of the rod portion. By offsetting the slider of the first latching claw from the slider of the second latching claw with respect to the central longitudinal axis of the rod portion, two identical crossmembers can be mounted on the same rod-shaped element in such a way that they are in a line or that their central longitudinal axes lie on a straight line, without the sliders having to be inappropriately small in size. In particular, the sliders can be designed to be long enough to grip the tubular element sufficiently to ensure secure mounting of the latching claw.

The sliders of the first latching claw and the second latching claw preferably each have an actuating surface which presses against the rod-shaped element when the latching claw is mounted on the rod-shaped element, so that the slider is moved into the open position against the pressing action of the spring element. Such an actuating surface allows the latching claws to be opened efficiently and (semi)automatically when the crossmember is mounted.

The gripping portions of the first latching claw and the second latching claw preferably each define a mounting direction in which they are to be moved for mounting on the rod-shaped element, and the actuating surfaces of the sliders of the first latching claw and the second latching claw are designed to lie inclined to the mounting direction. This allows particularly efficient opening of the latching claws during mounting with a structurally comparatively simple design.

Preferably, the gripping portions of the first latching claw and the second latching claw are each designed to grip the rod-shaped element by more than a quarter and at most by half. With latching claws designed in this way, rod-shaped elements can be gripped sufficiently to enable secure holding. At the same time, efficient mounting of the latching claw on the rod-shaped element can be made possible in this way.

Preferably, the gripping portions of the first latching claw and the second latching claw each comprise two spaced-apart gripping fingers. Such gripping fingers make it possible for the rod-shaped element to be gripped relatively broadly, while still allowing for the arrangement of a plurality of crossmembers in a line on a single rod-shaped element. Another aspect of the invention relates to a crossmember set comprising at least two crossmembers as described above. The two crossmembers can be mounted on a single rod-shaped element in such a way that the central longitudinal axes of the rod portions of the two crossmembers lie on a straight line.

With the crossmember set according to the invention, the effects and advantages described above in connection with the crossmember according to the invention and its preferred embodiments can be efficiently achieved.

In this case, as described above, the gripping portions of the first latching claw and the second latching claw of each of the two crossmembers each comprise two spaced-apart gripping fingers which lie adjacent to each other when the two crossmembers are mounted on the single rod-shaped element. In particular, they can lie alternately adjacent to each other, so that a gripping finger of one of the crossmembers is always between two gripping fingers of the other crossmember.

Another aspect of the invention relates to a furniture kit comprising a crossmember set as described above, a set of floor ladders and a set of longitudinal wind braces.

The floor ladders each comprise two vertical supports which are interconnected via an upper rung, i.e. an upper tubular element, and a lower rung, i.e. a lower tubular element. The two vertical supports are each equipped with a foot for placement on a floor.

The wind braces are each equipped at their longitudinal ends with a clamp which is designed to be mounted on one of the rungs of one of the floor ladders by gripping one of the rungs.

The latching claws of the at least two crossmembers of the crossmember set are each designed such that one of the rungs of the floor ladders or one of the rod portions of the at least two crossmembers of the crossmember set is the rod-shaped element. Crossmembers dimensioned in this way can of course also be mounted on the lower rungs of the first and second floor ladders. Similarly, wind braces dimensioned in this way can of course also be mounted on the upper of the second of the floor ladders and the lower of the first of the floor ladders.

The furniture kit can be provided so that different pieces of furniture can be flexibly constructed from the same components as required. Such furniture can be shelves, frames or tables, for example. In particular, the furniture can be office furniture. The components of the furniture kit are advantageously dimensioned in such a way that furniture can be assembled with comparatively few components. For example, a stable table can be assembled from two floor ladders, two crossmembers, a wind brace, and a plate element as described in more detail below.

The term "set" in connection with the furniture kit and its floor ladders, crossmembers and wind braces refers to a plurality of elements or components. For example, the set of floor ladders comprises two or more floor ladders.

Advantageously, the rod portion of the crossmember has substantially the same shape or the same cross section as the rungs of the floor ladders. The latching claws can thus be mounted on the rungs of the floor ladders as well as on the crossmembers.

In addition to the upper and lower rungs, the floor ladders can also comprise further rungs. These further rungs can be located above the upper rung, below the lower rung and/or between the upper and lower rungs.

Typically, the vertical supports and the rungs are substantially rod-shaped. In particular the rungs, but also the vertical supports, can have a substantially round or circular cross section. The vertical supports and the rungs of a floor ladder can each be more or less at right angles to one another, so that the rungs extend in parallel with one another and the vertical supports extend in parallel with one another.

The vertical supports of the floor ladders can be designed over long distances as rod profiles or, for example, round or square tubes. They are typically made from a sturdy material such as metal. The vertical supports of a floor ladder advantageously extend in parallel with one another.

The rungs of the floor ladders can also be designed over long distances as rod profiles or tubes. Advantageously, they have a circumference with an almost circular cross section. The upper and lower rungs are typically oriented horizontally in use and extend in parallel with one another. The rungs are preferably made of the same material as the vertical supports.

The feet of the floor ladders can be shaped in such a way that they can be placed directly on the floor. Alternatively, they can be designed to be fitted with an element suitable for placement, such as gliders. If the furniture created from the furniture kit is to be moved frequently, rollers can also be used as the feet of the floor ladders. The feet can also be adjustable in height to allow easy alignment of a piece of furniture produced.

The furniture kit according to the invention allows furniture to be assembled efficiently and flexibly according to the needs of the user. The users can assemble the furniture relatively easily without tools or with simple standard tools. A specialist is not required for the assembly. The use of special tools can also be dispensed with.

In particular, by providing crossmembers and wind braces for connecting the floor conductors, an extremely stable construction can be achieved with simple means and using comparatively few components. For example, two floor ladders can be interconnected at their upper or lower rungs via two crossmembers and at the same time between the upper rung of one floor ladder and the lower rung of the other floor ladder via a wind brace. The crossmembers are thus aligned horizontally and the wind brace is aligned diagonally or at an angle. In this way, the connection of floor ladders, crossmembers and wind brace is fixed and stabilized in all directions in space. This can ensure a safe construction, which can also be intended for a comparatively high load.

By equipping the crossmembers with the latching claws, it is possible for the crossmember to be easily and securely connected to the rungs. For example, they can be pressed onto the rungs from above and latch onto the rungs in such a way that they are partially gripped.

By equipping the wind braces with the clamps, the rungs can be gripped. The rungs can thus be held firmly by the wind brace even when the wind brace is oriented at an angle. Twisting of the two floor ladders can be reliably prevented in this way. For safety reasons, the clamps can be designed in such a way that they can only be opened with a key or a simple tool such as a screwdriver. This can prevent the clamps from being opened inadvertently.

A piece of furniture constructed from the furniture kit according to the invention can also be efficiently dismantled and converted. For example, further floor ladders having crossmembers and wind braces can be attached to existing structures in a simple manner. In this way, a piece of furniture can be extended as required. The furniture can also be dismantled efficiently and safely in the same way.

The furniture kit according to the invention thus makes it possible to flexibly create and convert furniture in a simple manner, virtually without tools. The furniture can be robust and offer sufficient safety to make it suitable for offices or retail outlets, for example. In particular, the furniture kit makes it possible to flexibly, efficiently and safely assemble, convert and dismantle frames and work tables.

Preferably, the rod portions of the at least two crossmembers are each shaped in such a way that the latching claws of the at least two crossmembers can be mounted thereon without tools. In this way, furniture such as frames can be assembled efficiently and in a space-saving manner, with structures that are at right angles to one another.

BRIEF DESCRIPTION OF THE DRAWINGS

Further advantageous embodiments of the invention result from the following description of embodiments of the invention with the aid of the schematic drawings. In particular, the crossmember according to the invention, the crossmember set according to the invention and the furniture kit according to the invention are described in more detail below with reference to the attached drawings on the basis of embodiments.

DETAILED DESCRIPTION OF EMBODIMENTS OF THE INVENTION

Certain terms are used in the following description for practical reasons and are not meant to be limiting. The words "right," "left," "below" and "above" indicate directions in the drawing to which reference is made. The terms "inward," "outward" "below," "above," "left," "right" or similar are used to describe the arrangement of designated parts relative to each other, the movement of designated parts relative to each other and the directions towards or away from the geometric center of the invention and designated parts thereof as shown in the figures. This relative spatial information also includes positions and orientations other than those shown in the figures. For example, if a part shown in the figures is turned over, elements or features that are described as "below" are then "above." The terminology includes the words expressly mentioned above, derivatives of the same, and words of similar meaning.

In order to avoid repetitions in the figures and the associated description of the different aspects and embodiments, certain features are to be understood as common for different aspects and embodiments. The omission of an aspect in the description or a figure does not suggest that this aspect is missing in the associated embodiment. Rather, such an omission can be used for clarity and to prevent repetitions. In this context, the following stipulation applies to the entire further description: If reference signs are included in a figure for the sake of clarity in the drawing, but are not mentioned in the directly associated description text, reference is made to their explanation in the preceding description of the figures. If reference signs are also mentioned in the description text belonging directly to a figure, but are not contained in the associated figure, reference is made to the preceding and following figures. Similar reference signs in two or more figures stand for similar or identical elements.

Figure 1:
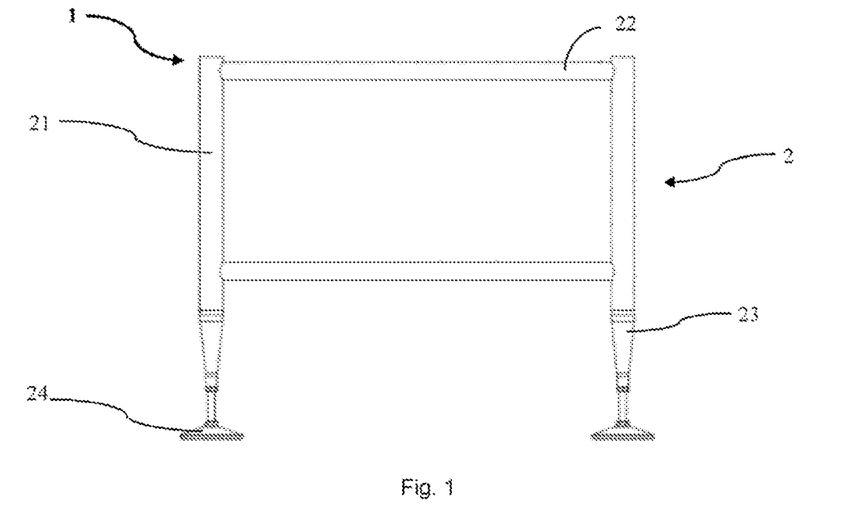
FIG. 1 is a front view of a floor ladder of an embodiment of a furniture kit according to the invention, which includes an embodiment of a crossmember set according to the invention with an embodiment of a crossmember according to the invention.

FIG. 1 shows a floor ladder 2 of a set of floor ladders 2 of an embodiment of a furniture kit 1 according to the invention. The floor ladder 2 is designed as the first component of an embodiment of a tube connection structure according to the invention. It consists of two parallel vertical supports 21 which are interconnected by two horizontal rungs 22. The rungs 22 are designed as straight tubes having a circular cross section. They are at right angles to the vertical supports 21 and are rigidly connected, for example welded, thereto. The vertical supports 21 are also designed for the most part as straight tubes having a circular cross section and each merge downward into a tapering foot 23. The two feet 23 are each equipped with a glider 24 which is arranged for placement of the floor ladder 2 on the floor.

Figure 2:
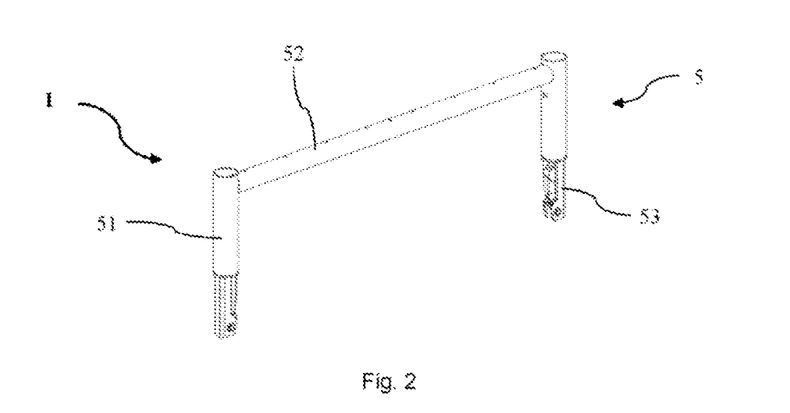
FIG. 2 is a front view of an assembly ladder of the furniture kit of FIG. 1 with a tube connector of the tube connection structure of FIG. 1.

FIG. 2 shows a one-rung assembly ladder 5 of a set of assembly ladders 5 of the furniture kit 1. The assembly ladder 5 is designed as a second component of an embodiment of a tube connection structure according to the invention. It comprises two tubular vertical supports 51 which are rigidly interconnected via a tubular rung 52. Together, the vertical supports 51 and the rung 52 are almost U-shaped. The rungs 52 of the assembly ladder have the same dimensions as the rungs 22 of the floor ladder 2 of FIG. 1, so that the assembly ladder 5 fits the floor ladder 2.

A tube connector 7 of the tube connection structure extends vertically downward from the lower ends of the vertical supports 51 of the assembly ladder 5. The tube connectors 7 are designed in such a way that they can be inserted into the vertical supports 21 of the floor ladder 2 or into vertical supports 51 of a further assembly ladder 5 and the connected vertical supports 21, 51 are fixed to one another by actuation.

In addition to the assembly ladder 5, as shown in FIG. 2, the set of assembly ladders 5 of the furniture kit 1 comprises further assembly ladders with vertical supports connected via two parallel rungs. These assembly ladders are designed to be longer or higher in comparison with the one-rung embodiment of FIG. 2.

Figure 3:
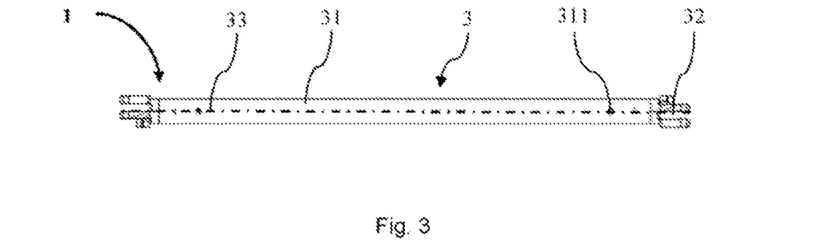
FIG. 3 is a top view of a crossmember of the furniture kit of FIG. 1.

FIG. 3 shows a crossmember 3 of a set of crossmembers 3 of the furniture kit 1. The crossmember 3 is formed from an elongate rod portion 31 and latching claws 32 extending outward from the longitudinal ends of the rod portion 31 on the left and right. The rod portion 31 is formed from a tube having a circular diameter corresponding to the diameter of the rungs 52 of the assembly ladder 5 and the rungs 22 of the floor ladder 2. On its upper side, the rod portion 31 is provided with a bore 311 as a female plug part close to its longitudinal ends. The latching claws 32 each comprise a rung receptacle 321 as a gripping portion.

The rod portion 31 of the crossmember 3 has a central longitudinal axis 33 which extends through the center of the circular cross section of the rod portion 31. As can be seen in FIG. 3, the rung receptacle 321 of the left latching claw 32 is offset from the rung receptacle 321 of the right latching claw 32 with respect to the central longitudinal axis 33 of the rod portion 31. In particular, in FIG. 3 the rung receptacle 321 of the left latching claw 32 is offset upward with respect to the central longitudinal axis 33 and the rung receptacle 321 of the right latching claw 32 is offset downward with respect to the central longitudinal axis 33.

Figure 4:
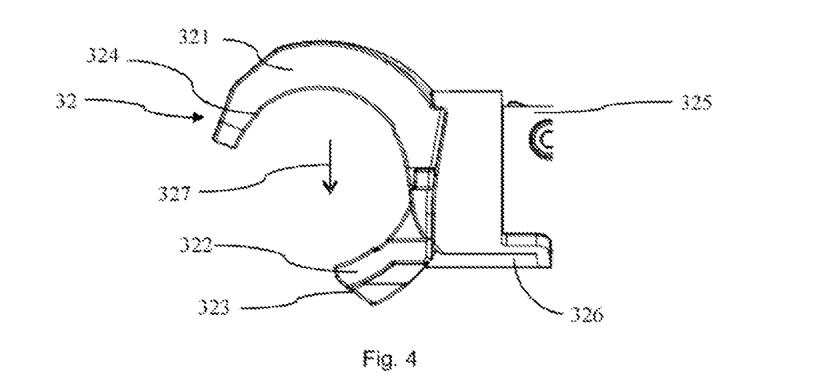
FIG. 4 is a side view of a latching claw of the crossmember of FIG. 3 in a locked position or a closed state.

In FIG. 4, the left of the two latching claws 32 of the crossmember 3 of FIG. 3 is shown enlarged by way of example. It can be seen that the latching claw 32 has an upper rung receptacle 321 integrally formed with a base 325 and a lower slider 322. The rung receptacle 321 has an almost semi-circular or semi-annular inner surface, which is substantially shaped to match the rungs 22, 52 of the floor and assembly ladders 2, 5. In an analogous manner, the slider 322 is provided with an approximately quarter-circular or quarter-annular inner surface, which is also substantially shaped to match the rungs 22, 52 of the floor and assembly ladders 2, 5. On the inner surfaces of the rung receptacle 321 and the slider 322, three contact bulges 324 are evenly distributed along the circumference.

The slider 322 extends through a guide slot 326 in the base 325 so that it can be slid to the left and right of the base 325 by a predefined amount. Inside the base 325, the latching claw 32 is equipped with a spring which pushes the slider 322 to the maximum leftward position shown in FIG. 4. In this locked position, the latching claw 32 is latched onto a rung 22, 52 or a rod portion 31 of another crossmember 3 when the rung receptacle 321 and the slider 322 receive said rung or portion. The crossmember 3 is then mounted on the rung 22, 52 or the rod portion 31. In particular, the rung 22, 52 or the rod portion 31 abuts the three contact bulges 324 in terms of a three-point connection, so that the rung 22, 52 or the rod portion 31 is held securely and tilting can be prevented.

Figure 5:
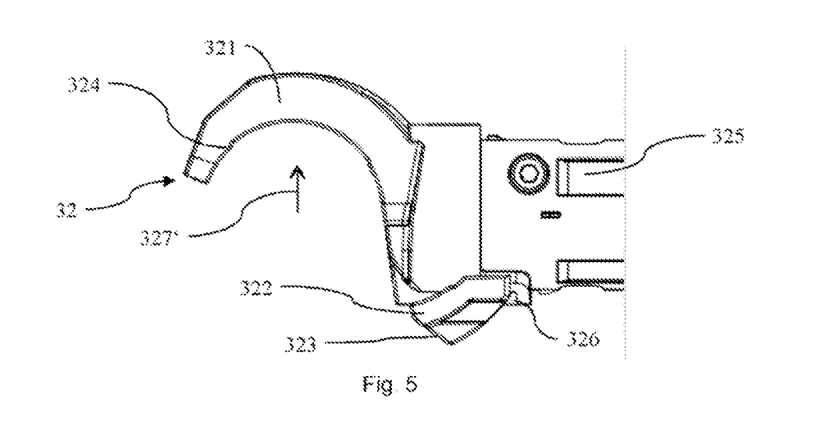
FIG. 5 is a side view of the latching claw of FIG. 4 in an open position or an open state.

As shown in FIG. 5, in order to release the latching claw 32, the slider 322 is pushed to the right along the guide slot 326, for example manually, against the spring force. As a result, the latching claw 32 is opened and the crossmember 3 can be removed upward from the rung 22, 52 in a dismantling direction 327'. In particular, the latching claw 32 is in an open position in the state shown in FIG. 5. In this way, the crossmember 3 can be dismantled efficiently without tools and a piece of furniture created from the furniture kit 1 can be dismantled or converted.

To mount the crossmember 3 on a rung 22, 52 or on a rod portion 31 of another crossmember 3, the latching claw 32 is pressed from above onto the rung 22, 52 or the rod portion 31 in an almost vertical mounting direction 327. The beveled or angled underside of the slider 322, which is designed as an actuating surface 323, pushes the slider to the right against the spring force, so that the rung receptacle 321 can receive the rung 22, 52 or the rod portion 31. Driven by the spring, the slider 322 then snaps back underneath the rung 22, 52 or the rod portion 31, so that secure fastening is achieved.

When mounting the crossmember 3, the latching claw 32, as shown in FIG. 4, is thus pressed onto the rung 22, 52 or the rod portion 31 in the mounting direction 327. As a result, the slider 322 is pushed to the right until it is in the open position shown in FIG. 5. If the latching claw 32 is moved further in the mounting direction 327, the slider 322 below the rung 22, 52 or the rod portion 31 is again pressed to the left by the spring until the latching claw 322 is again in the locked position shown in FIG. 4.

Figure 6:
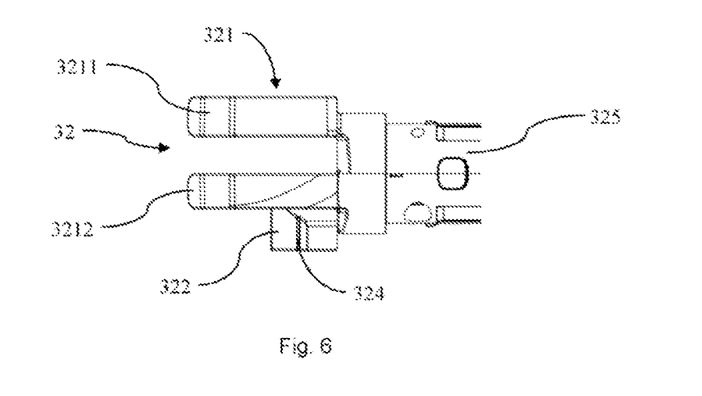
FIG. 6 is a top view of the latching claw of FIG. 4 in the locked position.

FIG. 6 shows the latching claw 322 from above. It can be seen here that the rung receptacle 321 has a first gripping finger 3211 and a second gripping finger 3212. The second gripping finger 3212 lies partially above the slider 322.

Figure 7:
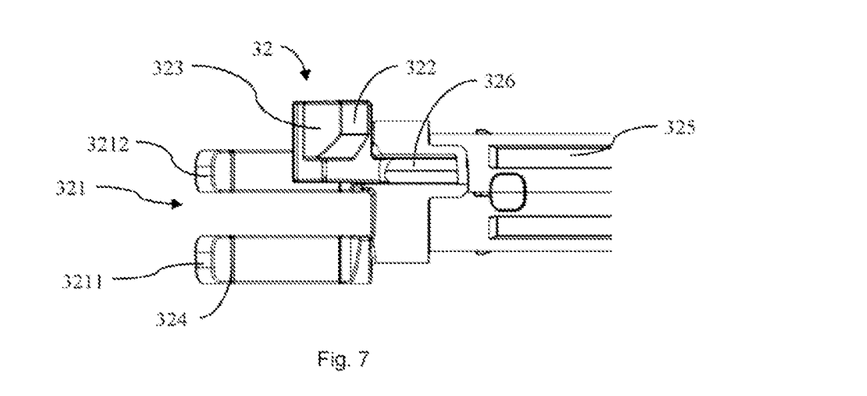
FIG. 7 is a bottom view of the latching claw of FIG. 4 in the locked position.

FIG. 7 shows the latching claw 322 from below. The first and second gripping fingers 3211, 3212 each have a width such that their inner surfaces provide sufficient support on the rung 22, 52 or the rod portion 31. The actuating surface 323 is also sufficiently large to be able to absorb pressure from the rung 22, 52 or the rod portion 31 during mounting and thereby push the slider 322 to the right.

Figure 8:
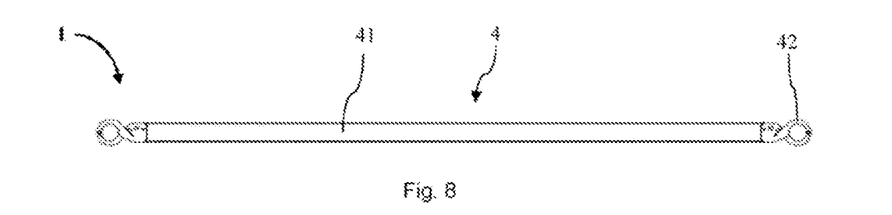
FIG. 8 is a front view of a wind brace of the furniture kit of FIG. 1.
Figure 9:
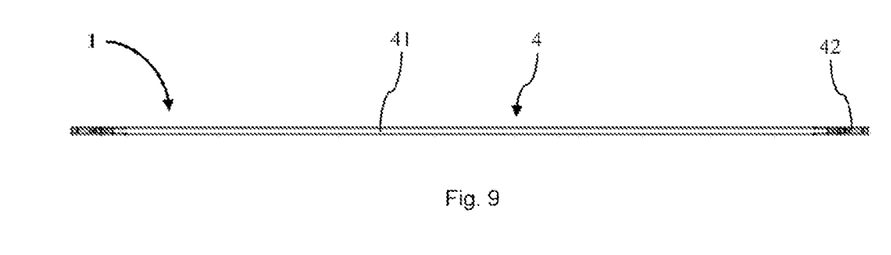
FIG. 9 is a top view of the wind brace of FIG. 5.

FIG. 8 shows a wind brace 4 of a set of wind braces 4 of the furniture kit 1. The wind brace 4 has a rod portion 41 which merges into a clamp 42 at each of its longitudinal ends. As can be seen together with FIG. 9, the rod portion 41 is designed as a solid square rod having a rectangular cross section. Due to the solid design, the wind brace can be particularly robust and designed to absorb comparatively large forces.

Figure 10:
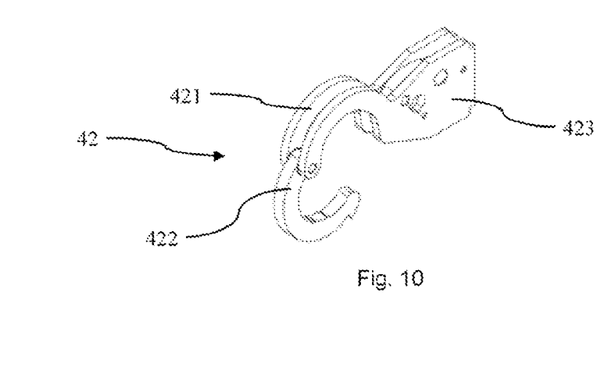
FIG. 10 is a perspective view of a clamp of the wind brace of FIG. 5.

FIG. 10 shows one of the clamps 42 of the wind brace 4 in an open position. The clamp 42 is provided with a base 423, an upper gripping portion 421 and a lower gripping portion 422 in the manner of a handcuff. The lower gripping part 422 is pivotally mounted on the upper gripping part 421 via a hinge joint. A locking means is located in the base 423 which fixes the lower gripping portion 422 when the clamp 42 is closed so that it grips a rung 22, 52. In particular, the lower gripping part 422 is equipped with a latching lug that engages behind a spring-loaded bolt of the locking means. The rung 22, 52 is thus held firmly and loosening of the buckle 42 without actuation of the locking means can be avoided.

Figure 11:
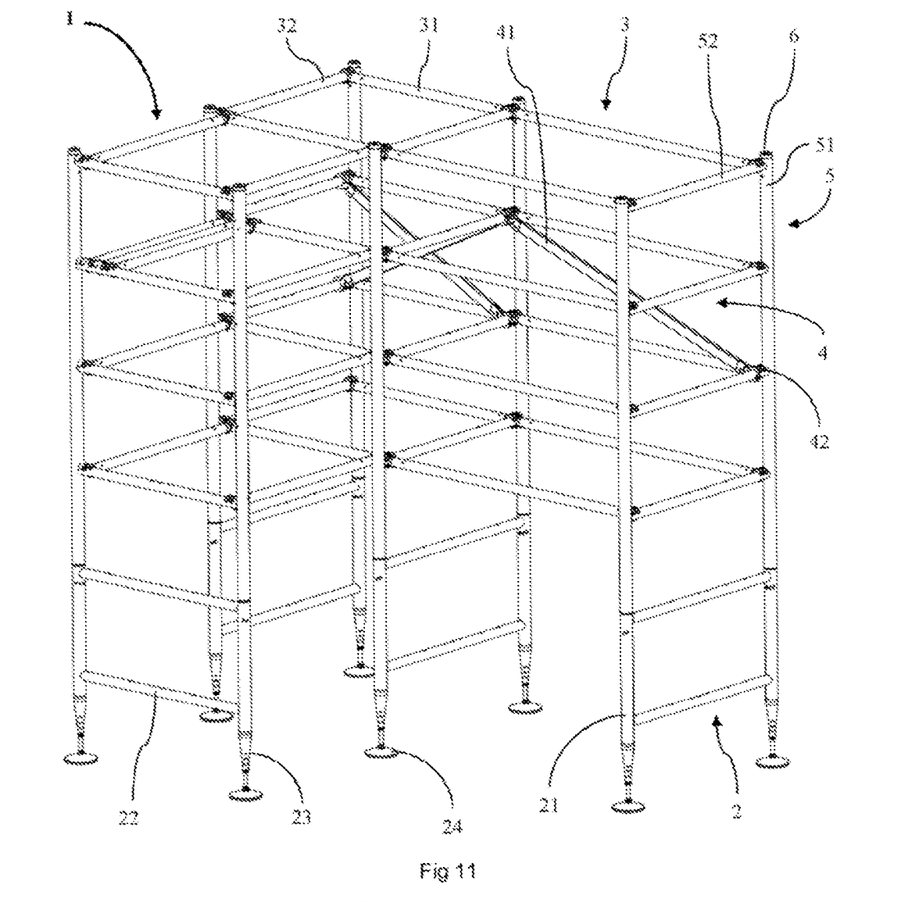
FIG. 11 is a perspective view of a frame construction assembled from the furniture kit of FIG. 1.

FIG. 11 shows a frame construction as a three-dimensional supporting tubular structure assembled from the furniture kit 1. The frame construction comprises four ladders which are each formed by a floor ladder 2 and two assembly ladders 5 vertically attached thereto, each with two rungs 52. The rungs 52 of the assembly ladders 5, which are at the same height, are each interconnected via two crossmembers 3. For this purpose, the latching claws 32 of the crossmembers 3 are mounted on the rungs 52 so as to adjoin the vertical supports 51 of the assembly ladders 5. At the same time, multiple wind braces 4 are connected diagonally or at an angle to rungs 52 at two different heights.

By providing the crossmembers 3 together with the wind braces 4 on the ladders 2, 5, the frame construction is extremely robust and rigid. In particular, it can absorb comparatively large loads in this way. The upper ends of the tube portions 51 of the uppermost assembly ladders 5 are covered and closed with covers 6.

Figure 12:
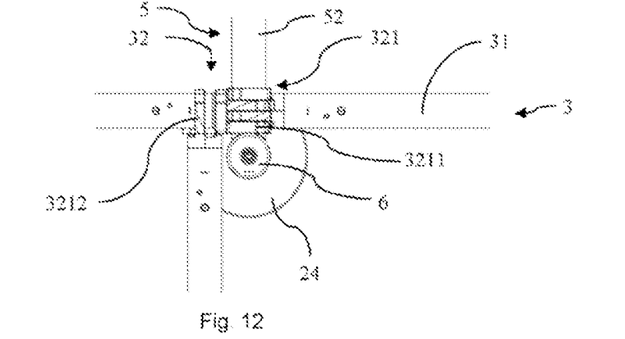
FIG. 12 is a view of a detail of the frame construction of FIG. 11.

FIG. 12 shows a different connection of the crossmembers 3 as provided in the frame construction shown in FIG. 11. Two crossmembers 3 are mounted in a line on the uppermost rung 52 of the uppermost ladder 5 close its vertical support 51. The latching claws 32 engage in one another. In particular, the second gripping fingers 3212 of the latching claws 32 lie between the first and the second gripping fingers 3211, 3212 of the other latching claw 32. Since the gripping portions 321 are offset with respect to the central longitudinal axis 33 of the rod portion 31, it is possible to orient the mounted crossmembers 3 in a line.

Although the invention is illustrated and described in detail by means of the figures and the associated description, this illustration and this detailed description are to be understood as illustrative and exemplary and not as limiting the invention. In order not to transfigure the invention, in certain cases well-known structures and techniques cannot be shown and described in detail. It is understood that those skilled in the art can make changes and modifications without departing from the scope of the following claims. In particular, the present invention covers further embodiments with any combination of features that may differ from the combinations of features explicitly described.

The present disclosure also includes embodiments with any combination of features mentioned or shown above or below for various embodiments. It also includes individual features in the figures, even if they are shown there in connection with other features and/or are not mentioned above or below. The alternatives of embodiments and individual alternatives of their features that are described in the figures and the description can also be excluded from the subject matter of the invention or from the disclosed items. The disclosure includes embodiments that only include the features described in the claims or in the embodiments and also those that include additional different features.

Furthermore, the term "comprise" and derivatives thereof do not exclude other elements or steps. Likewise, the indefinite article "a" or "an" and derivatives thereof do not exclude a plurality. The functions of a plurality of features listed in the claims can be fulfilled by one unit or one step. The terms "substantially," "about," "approximately" and the like in connection with a property or a value in particular also define exactly the property or exactly the value. The terms "about" and "approximately" in connection with a given numerical value or range can refer to a value or range which lies within 20%, within 10%, within 5% or within 2% of the given value or range.

What is claimed is:

1. A crossmember set comprising:
   at least two crossmembers, each crossmember comprising:
   a longitudinal rod portion having a central longitudinal axis, a first longitudinal end and a second longitudinal end substantially opposite the first longitudinal end,
   a first latching claw arranged at the first longitudinal end of the longitudinal rod portion, the first latching claw including a gripping portion shaped to correspond to a rod-shaped element and having two spaced-apart gripping fingers, and
   a second latching claw arranged at the second longitudinal end of the longitudinal rod portion, the second latching claw including a gripping portion shaped to correspond to a rod-shaped element and having two spaced-apart gripping fingers,
   wherein the gripping portion of the first latching claw is transversely offset from the gripping portion of the second latching claw with respect to the central longitudinal axis of the longitudinal rod portion, and
   wherein the at least two crossmembers are configured to be mounted on a single rod-shaped element without tools and in such a way that central longitudinal axes of the longitudinal rod portions of the at least two crossmembers align with each to be in a straight line, and
   wherein, when the at least two crossmembers are mounted on a single rod-shaped element, the two spaced-apart gripping fingers of the gripping portion of one of the first latching claw or the second latching claw of a first crossmember of the at least two crossmembers lie adjacent on the single rod-shaped element to the two spaced-apart gripping fingers of the gripping portion of one of the first latching claw or the second latching claw of a second crossmember of the at least two crossmembers, such that one of the gripping fingers of the one of the first latching claw or the second latching claw of the first crossmember is disposed between two of the gripping fingers of the one of the first latching claw or the second latching claw of the second crossmember.

2. The crossmember set of claim 1, wherein in each of the at least two crossmembers:
   the first latching claw and the second latching claw are each equipped with a spring element and a slider,
   the slider is movable between a locked position and an open position, and
   the spring element presses the slider into the locked position.

3. The crossmember set of claim 2, wherein in each of the at least two crossmembers the slider of the first latching claw is offset from the slider of the second latching claw with respect to the central longitudinal axis of the longitudinal rod portion.

4. The crossmember set of claim 2, wherein in each of the at least two crossmembers the sliders of the first latching claw and the second latching claw each have an actuating surface which presses against a rod-shaped element when the respective first or second latching claw is mounted on the rod-shaped element, so that the slider of the respective first or second latching claw is moved into the open position against a pressing action of the spring element.

5. The crossmember set of claim 4, wherein in each of the at least two crossmembers the gripping portions of the first latching claw and the second latching claw each define a mounting direction in which the gripping portions are to be moved for mounting on a rod-shaped element, and the actuating surfaces of the sliders of the first latching claw and the second latching claw are designed to lie inclined to the mounting direction.

6. The crossmember set of claim 1, wherein in each of the at least two crossmembers the gripping portions of the first latching claw and the second latching claw are each designed to grip a rod-shaped element by more than a quarter and at most by half.

7. A furniture kit comprising:
a set of floor ladders which each comprise two vertical supports which are interconnected via an upper rung as an upper tubular element and a lower rung as a lower tubular element, the two vertical supports each being equipped with a foot for placement on a floor,
a crossmember set according to claim 6, and
a set of longitudinal wind braces which are each equipped at their longitudinal ends with a clamp which is designed to be mounted on one of the rungs of one of the floor ladders by gripping one of the rungs,
wherein the gripping portions of the first and second latching claws of the at least two crossmembers of the crossmember set each is shaped to correspond to the rod-shaped element, wherein the rod-shaped element is one of the rungs of the floor ladders or one of the longitudinal rod portions of the at least two crossmembers of the crossmember set.

8. The furniture kit of claim 7, in which the longitudinal rod portions of the at least two crossmembers are each shaped in such a way that the first and second latching claws of the at least two crossmembers can be mounted thereon without tools.

* * * * *